United States Patent
Sumida et al.

(10) Patent No.: US 12,308,023 B2
(45) Date of Patent: *May 20, 2025

(54) CONVERSATION SUPPORT DEVICE, CONVERSATION SUPPORT SYSTEM, CONVERSATION SUPPORT METHOD, AND STORAGE MEDIUM

(71) Applicant: Honda Motor Co., Ltd., Tokyo (JP)

(72) Inventors: Naoaki Sumida, Saitama (JP); Masaki Nakatsuka, Saitama (JP); Kazuhiro Nakadai, Saitama (JP); Yuichi Yoshida, Saitama (JP); Takashi Yamauchi, Saitama (JP); Kazuya Maura, Oita (JP); Kyosuke Hineno, Oita (JP); Syozo Yokoo, Oita (JP)

(73) Assignee: Honda Motor Co., Ltd., Tokyo (JP)

( * ) Notice: Subject to any disclaimer, the term of this patent is extended or adjusted under 35 U.S.C. 154(b) by 391 days.

This patent is subject to a terminal disclaimer.

(21) Appl. No.: 17/216,656

(22) Filed: Mar. 29, 2021

(65) Prior Publication Data

US 2021/0304755 A1     Sep. 30, 2021

(30) Foreign Application Priority Data

Mar. 30, 2020   (JP) ................... 2020-059868

(51) Int. Cl.
| | |
|---|---|
| *G10L 15/22* | (2006.01) |
| *G06F 40/103* | (2020.01) |
| *G10L 15/08* | (2006.01) |
| *G10L 15/26* | (2006.01) |

(52) U.S. Cl.
CPC ............ *G10L 15/22* (2013.01); *G06F 40/103* (2020.01); *G10L 15/08* (2013.01); *G10L 15/26* (2013.01); *G10L 2015/225* (2013.01)

(58) Field of Classification Search
CPC ......... G10L 15/08; G10L 15/22; G10L 15/26; G10L 2015/225; G06F 40/103
See application file for complete search history.

(56) References Cited

U.S. PATENT DOCUMENTS

| | | | | |
|---|---|---|---|---|
| 5,765,874 | A * | 6/1998 | Chanenson ............. | B41F 17/02 283/67 |
| 9,678,571 | B1 * | 6/2017 | Robert ..................... | G06F 1/325 |
| 10,969,876 | B1 * | 4/2021 | Michaels ................ | G06F 3/017 |
| 11,113,027 | B2 * | 9/2021 | Ohnishi .................. | G06F 3/167 |

(Continued)

FOREIGN PATENT DOCUMENTS

| | | | | |
|---|---|---|---|---|
| CA | 2501368 C | * | 6/2013 | .......... G10L 19/173 |
| DK | 179174 B1 | * | 1/2018 | .......... G06F 3/0488 |

(Continued)

*Primary Examiner* — Paras D Shah
*Assistant Examiner* — Oluwadamilola M Ogunbiyi
(74) *Attorney, Agent, or Firm* — JCIPRNET (57) ABSTRACT

A voice recognition part performs voice recognition on a voice data and generates an utterance text which is a text indicating an utterance content. A display processing part moves a position of a display text displayed on a display part, displays the utterance text as a display text in a free region generated by the movement, and fixes the display text in a section of which fixing of a display position is instructed according to an operation as a fixed text at a predetermined display position to display on the display part.

9 Claims, 4 Drawing Sheets

(56) References Cited

U.S. PATENT DOCUMENTS

| | | | |
|---|---|---|---|
| 2007/0185718 A1* | 8/2007 | Di Mambro | G07C 9/37 704/270.1 |
| 2009/0070107 A1* | 3/2009 | Kawashima | G10L 19/002 704/229 |
| 2013/0097476 A1* | 4/2013 | Kuroda | G06F 40/169 715/201 |
| 2015/0365306 A1* | 12/2015 | Chaudhri | H04N 21/47205 715/753 |
| 2016/0005392 A1* | 1/2016 | Agiomyrgiannakis | G10L 13/027 704/261 |
| 2016/0026253 A1* | 1/2016 | Bradski | H04N 13/128 345/8 |
| 2016/0202950 A1* | 7/2016 | Hawley | G08G 5/0021 700/94 |
| 2016/0313877 A1* | 10/2016 | Ha | G06F 3/04842 |
| 2017/0060818 A1* | 3/2017 | Hightower | G06F 3/0483 |
| 2017/0140750 A1* | 5/2017 | Wang | G10L 25/21 |
| 2017/0147175 A1* | 5/2017 | Fukuda | G06F 3/0485 |
| 2017/0160884 A1* | 6/2017 | Son | G06F 3/04847 |
| 2017/0336960 A1* | 11/2017 | Chaudhri | H04L 51/18 |
| 2018/0034961 A1* | 2/2018 | Engelke | G10L 15/22 |
| 2018/0067596 A1* | 3/2018 | Wells | G06F 3/04883 |
| 2018/0129392 A1* | 5/2018 | Ko | G06F 3/0485 |
| 2018/0226101 A1* | 8/2018 | Taylor | G06F 16/41 |
| 2018/0286388 A1* | 10/2018 | Kawachi | G10L 15/22 |
| 2018/0288109 A1* | 10/2018 | Kawachi | G06F 40/279 |
| 2018/0359349 A1* | 12/2018 | Graylin | H04M 1/72436 |
| 2018/0364698 A1* | 12/2018 | Blank | A01D 41/127 |
| 2019/0018581 A1* | 1/2019 | Aronoff | G06F 3/04883 |
| 2019/0140986 A1* | 5/2019 | Anderson | G06F 40/279 |
| 2019/0156790 A1* | 5/2019 | Park | G09G 5/14 |
| 2019/0208024 A1* | 7/2019 | Jablonski | G06Q 20/308 |
| 2019/0212829 A1* | 7/2019 | Yang | H04L 51/04 |
| 2019/0331914 A1* | 10/2019 | Lee | G06F 3/013 |
| 2020/0111386 A1* | 4/2020 | Scholz | G10L 15/22 |
| 2020/0225705 A1* | 7/2020 | Curti | G06F 3/1423 |
| 2020/0319754 A1* | 10/2020 | Hwang | G06F 3/0482 |
| 2020/0357408 A1* | 11/2020 | Boekweg | G10L 15/26 |
| 2021/0020161 A1* | 1/2021 | Gao | G10L 13/08 |
| 2021/0294484 A1* | 9/2021 | Mano | G06Q 10/10 |

FOREIGN PATENT DOCUMENTS

| | | | | |
|---|---|---|---|---|
| EP | | 2383638 B1 * | 10/2018 | G06F 3/0482 |
| JP | | 2018170743 | 11/2018 | |
| WO | WO-2013149403 A1 * | | 10/2013 | G06F 17/276 |
| WO | WO-2015168408 A1 * | | 11/2015 | H04L 51/046 |
| WO | WO-2016004757 A1 * | | 1/2016 | G10L 21/0232 |
| WO | WO-2017201326 A1 * | | 11/2017 | G06F 3/016 |
| WO | WO-2018199483 A1 * | | 11/2018 | G06F 3/0488 |
| WO | WO-2020138192 A1 * | | 7/2020 | G06F 16/9536 |

* cited by examiner

CONVERSATION SUPPORT DEVICE, CONVERSATION SUPPORT SYSTEM, CONVERSATION SUPPORT METHOD, AND STORAGE MEDIUM

CROSS-REFERENCE TO RELATED APPLICATION

This application claims the priority benefit of Japan application serial no. 2020-059868, filed on Mar. 30, 2020. The entirety of the above-mentioned patent application is hereby incorporated by reference herein and made a part of this specification.

BACKGROUND

Technical Field

The disclosure relates to a conversation support device, a conversation support system, a conversation support method, and a storage medium.

Related Art

Conventionally, a conversation support system has been proposed to support a person with a hearing disability in a conversation held by multiple people such as in a conference. Such a conversation support system converts a voice uttered in the conversation into a text by voice recognition and displays the text in a converted picture. For example, a conference support system described in Patent Document 1 (Japanese Patent Application Laid-Open No. 2018-170743) includes a terminal used by a conference participant and a conference support device. The conference support device acquires an utterance content, infers words corresponding to pronouns when text information of an utterance content contains pronouns, and transmits the text information and the words corresponding to the inferred pronouns to the terminal. The terminal displays the text information of the utterance content and the words corresponding to the pronouns. The conference support device performs the same display on the monitor of its own device as the terminal device. The person with a hearing disability understands the utterances of the conference participants by reading the text indicating the utterance content and the words corresponding to the pronouns.

The conference support device repeats the processing of displaying the text converted from the voice on the monitor upon each utterance and moving the position of the already displayed text. On the other hand, the terminal transmits a text inputted by the person with a hearing disability to the conference support device, and the conference support device displays the text inputted from the terminal on the monitor. Therefore, the person with a hearing disability can convey his/her intention to other participants who see the displayed text. When the person with a hearing disability wants to ask a question in the conversation, he/she has the terminal input a text indicating the question. The terminal transmits the inputted text to the conference support device, and the conference support device displays the text inputted from the terminal on the monitor.

However, in the conference support system described in Patent Document 1, when other participants sequentially make utterances, the display position of the text indicating the utterance content moves, a text of a new utterance content is added, and a part of the displayed text is erased from the display region of the monitor. The moving text also includes the text inputted by the person with a hearing disability. When the inputted text indicates a question, it may disappear from the display region of the monitor due to the movement without being answered. Therefore, the person with a hearing disability may be forced to input the text again in order to continue to have other participants recognize the question. Also, it may arouse a feeling of psychological resistance in the person with a hearing disability to request an answer to a question by interrupting the utterances of other participants. It may be difficult for the person with a hearing disability to display his/her intention to other participants by means other than text input (e.g., utterance by voice).

SUMMARY

According to an aspect of the disclosure, a conversation support device includes a voice recognition part and a display processing part. The voice recognition part performs voice recognition on a voice data and generates an utterance text which is a text indicating an utterance content. The display processing part moves a position of a display text displayed on a display part, displays the utterance text as a display text in a free region generated by the moving of the position of the display text, and fixes the display text in a section of which fixing of a display position is instructed according to an operation as a fixed text at a predetermined display position to display on the display part.

According to another aspect of the disclosure, a conversation support system includes the conversation support device above and a terminal device. The terminal device includes an operation part receiving the operation and a communication part transmitting the operation to the conversation support device.

According to another aspect of the disclosure, a conversation support method, which is a conversation support method in a conversation support device, includes steps below. In a voice recognition step, voice recognition is performed on a voice data and an utterance text which is a text indicating an utterance content is generated. In a display processing step, a position of a display text displayed on a display part is moved, the utterance text is displayed as a display text in a free region generated by the movement, and the display text in a section of which fixing of a display position is instructed according to an operation is fixed as a fixed text at a predetermined display position to display on the display part.

According to another aspect of the disclosure, a non-transitory computer readable storage medium stores a program which causes a computer of a conversation support device to execute procedures below. In a voice recognition procedure, voice recognition is performed on a voice data and an utterance text which is a text indicating an utterance content is generated. In a display processing procedure, a position of a display text displayed on a display part is moved, the utterance text is displayed as a display text in a free region generated by the movement, and the display text in a section of which fixing of a display position is instructed according to an operation is fixed as a fixed text at a predetermined display position to display on the display part.

DESCRIPTION OF THE EMBODIMENTS

Embodiments of the disclosure provide a conversation support device, a conversation support system, a conversation support method, and a storage medium which make it possible to more surely recognize a specific utterance content without disturbing a conversation.

(1) According to an aspect of the disclosure, a conversation support device includes a voice recognition part and a display processing part. The voice recognition part performs voice recognition on a voice data and generates an utterance text which is a text indicating an utterance content. The display processing part moves a position of a display text displayed on a display part, displays the utterance text as a display text in a free region generated by the moving of the display text, and fixes the display text in a section of which fixing of a display position is instructed according to an operation as a fixed text at a predetermined display position to display on the display part.

(2) According to another aspect of the disclosure, in the conversation support device according to (1), the display processing part may display the fixed text more preferentially than other display texts.

(3) According to another aspect of the disclosure, the conversation support device according to (1) or (2) may further include a voice analysis part which calculates a characteristic parameter indicating a characteristic of the voice data for each frame, determine a voiceless section and a voice section based on the characteristic parameter, and determine as an utterance section a section ranging from the voice section started after the voiceless section which lasted for a predetermined time or longer, to a start of a next voiceless section which lasts for the predetermined time or longer. The display processing part may display the utterance text on the display part for each utterance section, and determine a display text in any section of the utterance section displayed on the display part as the fixed text.

(4) According to another aspect of the disclosure, in the conversation support device according to (3), the display processing part may display a display indicating a sound collecting part which has acquired the voice data in association with the utterance text.

(5) According to another aspect of the disclosure, in the conversation support device according to any one of (1) to (4), when release of fixing of the display position of the fixed text is instructed according to an operation, the display processing part may release fixing of the display position of the fixed text.

(6) According to another aspect of the disclosure, in the conversation support device according to (5), the display processing part may duplicate a display text in a section of which fixing of a display position is instructed as the fixed text according to an operation, and erase the fixed text when fixing of the display position of the fixed text is released.

(7) According to another aspect of the disclosure, a conversation support system includes the conversation support device according to any one of (1) to (6) and a terminal device. The terminal device includes an operation part receiving the operation and a communication part transmitting the operation to the conversation support device.

(8) According to another aspect of the disclosure, a conversation support method, which is a conversation support method in a conversation support device, includes steps below. In a voice recognition step, voice recognition is performed on a voice data and an utterance text which is a text indicating an utterance content is generated. In a display processing step, a position of a display text displayed on a display part is moved, the utterance text is displayed as a display text in a free region generated by the movement, and the display text in a section of which fixing of a display position is instructed according to an operation is fixed as a fixed text at a predetermined display position to display on the display part.

(9) According to another aspect of the disclosure, a non-transitory computer readable storage medium stores a program which causes a computer of a conversation support device to execute procedures below. In a voice recognition procedure, voice recognition is performed on a voice data and an utterance text which is a text indicating an utterance content is generated. In a display processing procedure, a position of a display text displayed on a display part is moved, the utterance text is displayed as a display text in a free region generated by the movement, and the display text in a section of which fixing of a display position is instructed according to an operation is fixed as a fixed text at a predetermined display position to display on the display part.

According to the aspect of (1), (7), (8), or (9) of the disclosure, the display position of the utterance text acquired according to the operation of the user is fixed at the predetermined display position. Therefore, even if a text indicating a new utterance content is acquired, the display position does not move as the other display texts do, so it is possible to allow the participants (e.g., a person with a hearing disability) of the conversation to more surely recognize the utterance content indicated by the fixed text without disturbing the conversation.

According to the aspect of (2), the participants who come into contact with the display picture may pay attention to the fixed text more easily than other display texts. Therefore, the utterance content indicated by the fixed text may be more surely recognized by the participants of the conversation.

According to the aspect of (3), a display text indicating the utterance content is displayed for each utterance section of the participants, and the fixed text is determined. Therefore, compared to the case where the display text is displayed without dividing into utterance sections, the participants who come into contact with the display text can easily understand the utterance content indicated by the display text and determine individual utterances in the conversation.

According to the aspect of (4), the user who comes into contact with the display may intuitively learn about the device which is the acquisition source of the voice data from which the utterance text indicating the utterance content is converted, or may intuitively learn about the user who mainly uses such a device.

According to the aspect of (5), since fixing of the display position of the fixed text is released, it is possible to distract other participants from the fixed text and prompt them to return to the original agenda or change to another agenda.

According to the aspect of (6), since the display text of the section instructed as the fixed text is also moved according to the addition of a new display text in the same manner as other display texts, the processing for rearranging the fixed text as the display text may be omitted.

Figure 1:
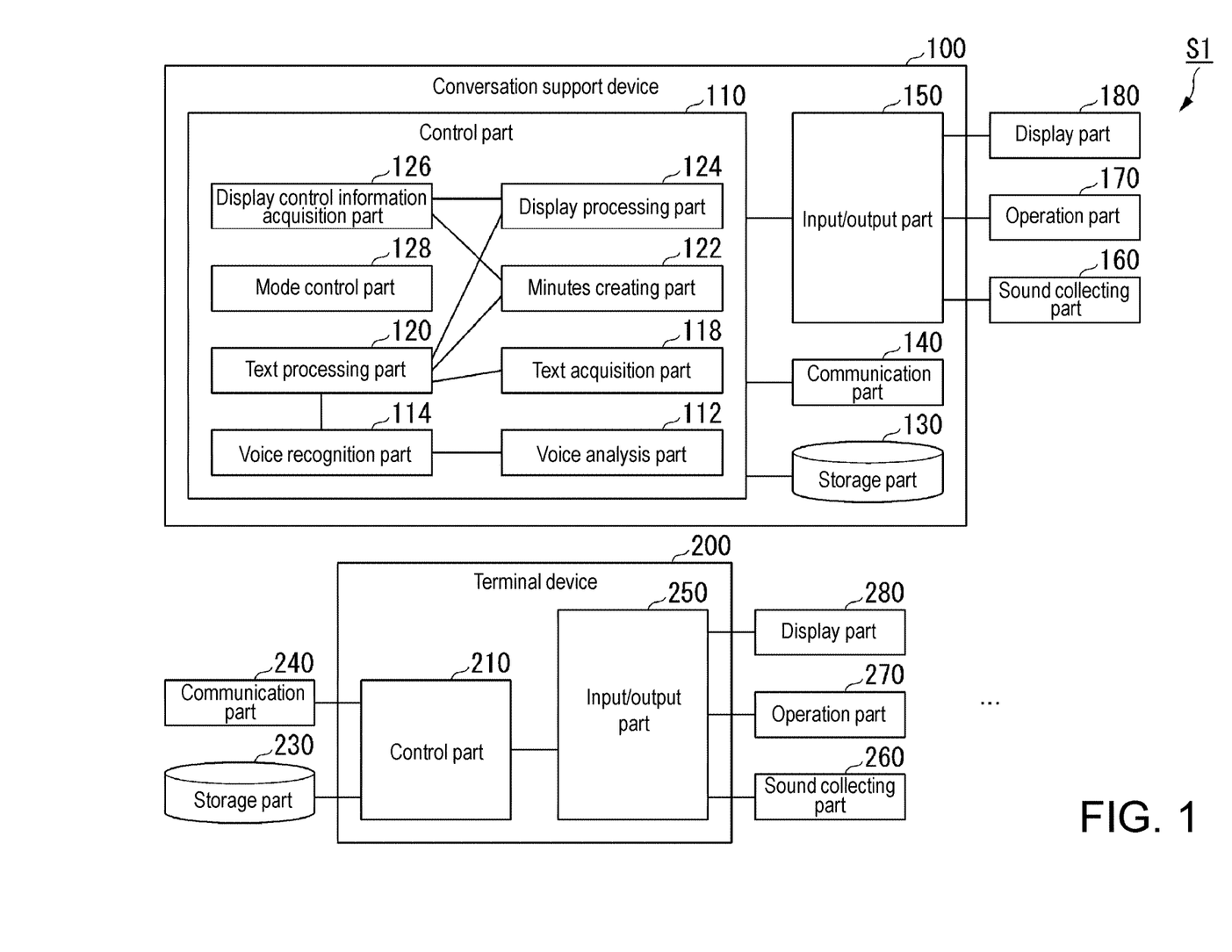
FIG. 1 is a block diagram showing a configuration example of a conversation support system according to this embodiment.

Hereinafter, an embodiment of the disclosure will be described with reference to the drawings. First, a configuration example of a conversation support system S1 according to this embodiment will be described. FIG. 1 is a block diagram showing a configuration example of the conversation support system S1 according to this embodiment. The conversation support system S1 includes a conversation support device 100 and a terminal device 200.

The conversation support system S1 is used in a conversation in which two or more participants participate. The participants may include one or more persons with a disability in one or both of speaking and listening to a voice (hereinafter referred to as "a person with a disability"). The person with a disability may individually operate an operation part 270 of the terminal device 200 to input a text indicating an utterance content (hereinafter "a second text") to the conversation support device 100. A person who does not have difficulty in speaking and listening to a voice (hereinafter referred to as "a person without a disability") may input a spoken voice to the conversation support device 100 by individually using a sound collecting part 160 or using a device (e.g., the terminal device 200) having a sound collecting part. The conversation support device 100 performs a known voice recognition processing on a voice data indicating the inputted voice and converts the voice data into a text (hereinafter "a first text") indicating the voice-based utterance content. Each time the text of either the first text obtained by conversion or the second text obtained from the terminal device 200 is acquired, the conversation support device 100 displays the acquired text on a display part 180. The person with a disability can understand the utterance content in the conversation by reading the displayed text (hereinafter "a display text").

The conversation support device 100 moves the position of the already displayed display text in a predetermined direction (e.g., upward), displays a new display text in a free region generated by the movement in a display region of the display part 180, and erases the display text which has been moved outside the display region (scrolling). The person with a disability may operate the operation part 270 of the terminal device 200 and instruct to the conversation support device 100 fixing of a display position and a section among the display text of which the display position is to be fixed. Such a section may be a first text indicating an utterance content of other participants. When fixing of the display position is instructed, the conversation support device 100 fixes and displays the display text of the instructed section at a predetermined display position in the display region of the display part 180 (pinning). Therefore, even if the display text is sequentially displayed according to the utterances of other participants, the display position of the display text of the section instructed by the person with a disability remains fixed. Therefore, it is possible to allow other participants including persons without a disability to more surely recognize the utterance content of the display text of the instructed section.

Also, when the display position of the display text is fixed, the person with a disability may operate the operation part 270 of the terminal device 200 and instruct the conversation support device 100 to release the fixing of the display position. When release of fixing of the display position is instructed, the conversation support device 100 erases the display text of which the display position has been fixed (unpinning). Accordingly, the person with a disability may release the fixing at any timing, for example, when a newer display text is displayed as an answer to a question presented in the display text of the section of which the display position has been instructed by the person with a disability. Therefore, it is not necessary to make other participants unnecessarily aware of the display text of which the display position has been fixed.

Although the conversation support system S1 as shown in FIG. 1 includes one conversation support device 100 and one terminal device 200, the disclosure is not limited thereto. The number of the terminal devices 200 may be two or more, or may be zero. The conversation support device 100 and the terminal device 200 have functions respectively as a master device and a slave device in the example shown in FIG. 1.

In this application, "conversation" means communication between two or more participants; this term is not limited to communication using a voice, but also includes communication using other types of information media such as texts. The conversation is not limited to voluntary or arbitrary communication between two or more participants, but also includes communication in which a particular participant (e.g., a moderator) moderates the utterances of other participants, such as a meeting, a presentation, a lecture, and a ceremony. In addition, "utterance" means conveying intentions using language; this term is not limited to conveying intentions by uttering a voice, but also includes conveying intentions using other types of information media such as texts.

(Conversation Support Device)

Next, a configuration example of the conversation support device 100 according to this embodiment will be described. The conversation support device 100 is configured to include a control part 110, a storage part 130, and an input/output part 150. The control part 110 realizes the functions of the conversation support device 100 and controls the functions by performing various calculation processings. Although the control part 110 may be realized by a dedicated member, it may also include a processor and a storage medium such as a ROM (read only memory) and a RAM (random access memory). The processor reads a predetermined program stored in the ROM in advance, develops the read program in the RAM, and uses the storage region of the RAM as a working region. The processor executes processings instructed by various instructions described by the read program to realize the functions of the control part 110. The functions to be realized may include the function of each part to be described later. In the following description, the execution of a processing instructed by the instruction described in the program may be referred to as "executing the program", "execution of the program", or the like. The processor is, for example, a CPU (central processing unit) or the like.

The control part 110 is configured to include a voice analysis part 112, a voice recognition part 114, a text acquisition part 118, a text processing part 120, a minutes creating part 122, a display processing part 124, a display control information acquisition part 126, and a mode control part 128.

A voice data is inputted to the voice analysis part 112 from the sound collecting part 160 via the input/output part 150. The voice analysis part 112 calculates a voice feature quantity for each frame of a predetermined length for the inputted voice data. The voice feature quantity is represented by a characteristic parameter indicating the acoustic feature of the voice in the frame. The calculated voice feature quantity is, for example, a power, a number of zero-crossings, a mel-frequency cepstrum coefficient (MFCC), and the like. Among the above, the power and the number of zero-crossings are used to determine the utterance state. The MFCC is used for voice recognition. The period of one frame is, for example, 10 ms to 50 ms.

The voice analysis part 112 determines the utterance state for each frame based on the calculated voice feature quantity. The voice analysis part 112 performs a known voice section detection processing (VAD: voice activity detection), and determines whether the frame to be processed at this time (hereinafter "a current frame") is a voice section. The voice analysis part 112, for example, determines as an utterance section a frame in which the power is greater than a predetermined lower limit of the power and the number of zero-crossings is within a predetermined range (e.g., 300 to 1000 times per second), and determines the other frames as non-voice sections. When the frame immediately before the current frame (hereinafter "a previous frame") is a non-voice section but the current frame is newly determined as a voice section, the voice analysis part 112 determines the utterance state of the current frame as an utterance start. A frame in which the utterance state is determined as an utterance start is referred to as an "utterance start frame". When the previous frame is a voice section but the current frame is newly determined as a non-voice section, the voice analysis part 112 determines the utterance state of the previous frame as an utterance end. A frame in which the utterance state is determined as an utterance end is referred to as an "utterance end frame". The voice analysis part 112 determines a series of sections from an utterance start frame to a next utterance end frame as one utterance section. One utterance section substantially corresponds to one utterance. The voice analysis part 112 sequentially outputs the calculated voice feature quantity for each determined utterance section to the voice recognition part 114. When sound collecting part identification information is added to the inputted voice data, the sound collecting part identification information may be added to the voice feature quantity to output to the voice recognition part 114. The sound collecting part identification information is identification information (e.g., Mic ID: microphone identifier) for identifying each sound collecting part 160.

The voice recognition part 114 performs a voice recognition processing on the voice feature quantity inputted from the voice analysis part 112 for each utterance section by using a voice recognition model stored in advance in the storage part 130. The voice recognition model includes an acoustic model and a language model. The acoustic model is used to determine a phoneme sequence consisting of one or more phonemes from the voice feature quantity. The acoustic model is, for example, an HMM (hidden Markov Model). The language model is used to use phrases composed of phoneme sequences. The language model is, for example, an n-gram model. The voice recognition part 114 determines as a recognition result a phrase having the highest likelihood calculated by using the voice recognition model for the inputted voice feature quantity. The voice recognition part 114 outputs first text information indicating a text indicating the phrases constituting the utterance content as the recognition result to the text processing part 120. In other words, the first text information is information indicating an utterance text (hereinafter "a first text") indicating the utterance content of the collected voice.

When the sound collecting part identification information is added to the inputted voice feature quantity, the sound collecting part identification information may be added to the first text information to output to the text processing part. Further, the voice recognition part 114 may determine the speaker by performing a known speaker identification processing on the inputted voice feature quantity. The voice recognition part 114 may add speaker identification information (speaker ID) indicating the determined speaker to the voice feature quantity to output to the text processing part 120. The speaker ID is identification information for identifying each speaker.

The text acquisition part 118 receives text information from the terminal device 200 using the communication part 140. An operation signal is received. The text acquisition part 118 outputs the acquired text information as second text information to the text processing part 120. The second text information is inputted in response to an operation on the operation part 270 of the terminal device 200, and indicates a text representing the utterance content of the input person mainly for the purpose of communicating with the participants in the conversation. The text acquisition part 118 may receive the text information based on the operation signal inputted from the operation part 170 using the input/output part 150 according to the same method as a control part 210 of the terminal device 200 to be described later In this application, the operation signal received from the terminal device 200 and the operation signal inputted from the operation part 170, which are used for the processing in each part of the control part 110, may be collectively referred to as "acquired operation signals" or simply "operation signals". The text acquisition part 118 may add device identification information for identifying either device of the operation part 170 and the terminal device 200, which are the acquisition source of the operation signal, to the second text information to output to the text processing part 120. In addition, "sound collecting part identification information", "speaker identification information", and "device identification information" may be collectively referred to as "acquisition source identification information".

The text processing part 120 acquires the first text indicated by the first text information inputted from the voice recognition part 114 and the second text indicated by the second text information inputted from the text acquisition part 118 as the texts (hereafter "display texts") to be displayed on the display part 180. The text processing part 120 performs a predetermined processing for displaying or preserving the acquired display text. The text processing part 120 performs, for example, a known morphological analysis on the first text, divides the first text into one or more words, and determines a part of speech for each word. The text processing part 120 may delete from the first text texts indicating words which do not substantially contribute to the utterance content, such as words of which the determined part of speech is an interjection, words which are repeatedly uttered within a predetermined period (e.g., 10 to 60 seconds), and the like.

Also, the text processing part 120 may generate utterance identification information for identifying individual utterances for each of the first text information inputted from the voice recognition part 114 and the second text information inputted from the text acquisition part 118, and add the generated utterance identification information to display text information indicating the display text related to the utterance. For example, the text processing part 120 may generate, as the utterance identification information, a sequence in which the first text information or the second text information is inputted to the text processing part 120 after the start of a series of conversations. The text processing part 120 outputs the display text information to the minutes creating part 122 and the display processing part 124. In addition, when the acquisition source identification information is added to the first text information inputted from the voice recognition part 114 or the second text information inputted from the text acquisition part 118, the text processing part 120 may add the acquisition source identification information to the display text information to output to the minutes creating part 122 and the display processing part 124.

The minutes creating part 122 sequentially stores to the storage part 130 the display text information inputted from the text processing part 120. In the storage part 130, the stored individual display text information is sequentially accumulated and formed as minutes information. The minutes creating part 122 may store to the storage part 130 date and time information indicating the date and time when the display text information is inputted from the text processing part 120 in association with the display text information. When the acquisition source identification information is added to the displayed text information, the minutes creating part 122 may store to the storage part 130 the acquisition source identification information, in place of the date and time information or together with the date and time information, in association with the display text information. In addition, when the utterance identification information is added to the displayed text information, the minutes creating part 122 may store to the storage part 130 the utterance identification information, in place of the date and time information or the acquisition source identification information or together with the date and time information or the acquisition source identification information, in association with the display text information.

The display processing part 124 generates a display picture data for displaying the display text indicated by the display text information inputted from the text processing part 120 on the display part 180. The display processing part 124 reads a display picture template stored in the storage part 130 in advance, and the display processing part 124 updates the display picture by allocating a newly inputted display text to a predetermined text display region set in advance for displaying the display text in the display picture template. When there is no more region for allocating a new display text in the text display region, the display processing part 124 updates the display picture by scrolling the display text in a predetermined direction (e.g., the vertical direction) in the text display region each time the display text information is newly inputted from the text processing part 120. In the scrolling, the display processing part 124 moves the display region of the already displayed display text which has already been allocated to the text display region in the predetermined direction and secures a free region to which no display text is allocated. The free region is provided to be in contact with one end of the text display region in a direction opposite to the moving direction of the display text. The display processing part 124 determines the movement amount of the already displayed display text so that the size of the secured free region is equal to the size of the display region required for displaying the new display text. The display processing part 124 allocates a new display text to the secured free region, and erases the already displayed display text arranged outside the text display region by the movement.

When fixing instruction information is inputted from the display control information acquisition part 126 during display of the display picture, the display processing part 124 determines a section of the already displayed display text instructed by the fixing instruction information, i.e., a part of the display text allocated to the text display region. The fixing instruction information is control information which instructs fixing of the display position and indicates the section of the target display text. The section of which the display position is to be fixed may be determined for each utterance section by using the utterance identification information included in the fixing instruction information. The display processing part 124 updates the display picture by allocating the display text in the determined section as a fixed text to a fixed display region arranged at a predetermined display position in the display picture. The display processing part 124 does not scroll the fixed text allocated to the fixed display region but fixes the display position.

When fixing release information is inputted from the display control information acquisition part 126 during the display of the fixed text, the display processing part 124 releases the fixing of the display position of the fixed text. The fixing release information is control information instructing release of the fixing of the display position for the fixed text. The display processing part 124 erases the fixed text from the display picture when releasing the fixing of the display position.

When text deletion information is inputted from the display control information acquisition part 126 during display of the display picture, the display processing part 124 may determine a section of a part of the display text allocated to the text display region and erase the display text in the determined section. The text deletion information is control information instructing erasing of the display text and the section of the target display text. The target section may be determined by using the utterance identification information included in the text deletion information. The display processing part 124 updates the display picture by moving another newer display text to the region in which the display text has been erased in the text display region (text padding).

Figure 3:
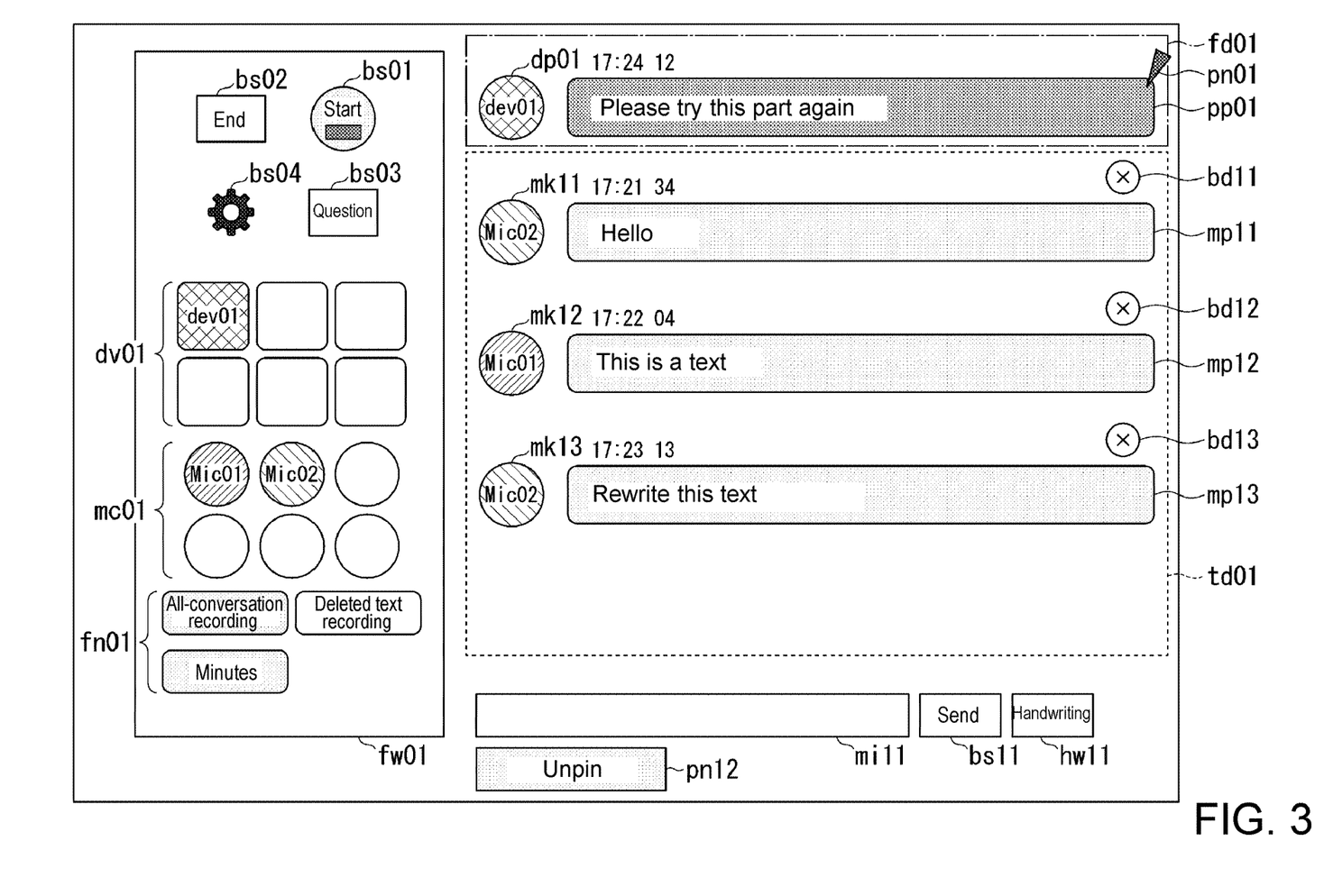
FIG. 3 is a view showing another example of a display picture according to this embodiment.

The display processing part 124 outputs the display picture data indicating the updated display picture to the display part 180 via the input/output part 150 each time the display picture is updated. Further, the display processing part 124 transmits the display picture data to the terminal device 200 by using the communication part 140. Therefore, the display processing part 124 can display the updated display picture on the display part 180 of its own device and a display part 280 of the terminal device 200. The display picture displayed on the display part 180 of its own device may include an operation region. As shown in FIG. 3, various picture components for operating the own device and displaying the operating status are arranged in the operation region.

The display control information acquisition part 126 receives display control information for controlling the display of the display picture from the terminal device 200. The display control information acquisition part 126 may generate a display control signal based on an operation signal inputted via the input/output part 150 by using the same method (to be described later) as the control part 210 of the terminal device 200. The display control information acquisition part 126 outputs the acquired display control information to the display processing part 124. The extracted display control signal may include any of the above fixing instruction information, fixing release information, and text deletion information.

The display control information acquisition part 126 may output the extracted display control information to the minutes creating part 122. The minutes creating part 122 determines the section of the display text instructed by the fixing instruction information in the display control information inputted from the display control information acquisition part 126, and stores to the storage part 130 the fixing instruction information in association with the display text information indicating the display text in the determined section. The minutes creating part 122 associates the fixing release information with the display text information to store the fixing release information to the storage part 130, wherein the fixing release information is in the display control information inputted from the display control information acquisition part 126, and the display text information determines the fixed text instructed by the fixing instruction information and display the determined fixed text as the display text. Therefore, the minutes information includes and records information about the display text of the section in which the fixing of the display position and the release of the fixing are instructed.

The mode control part 128 controls the operation mode of the conversation support device 100 based on the acquired operation signal. The mode control part 128 makes it possible to set, as the operation mode, whether the functions which the conversation support device 100 can provide are necessary, or a combination of such functions. The mode control part 128 extracts mode setting information related to mode setting from the acquired operation signal, and outputs the mode control information for instructing the operation mode instructed by the extracted mode setting information to each part.

For example, the mode control part 128 makes it possible to control an operation start, an operation end, whether to create minutes, whether to record a voice, and the like. When the extracted mode setting information indicates the operation start, the mode control part 128 outputs mode control information indicating the operation start to each part of the control part 110. When the mode control information indicating the operation start is inputted from the mode control part 128, each part of the control part 110 starts their respective predetermined processing. When the extracted mode setting information indicates the operation end, the mode control part 128 outputs mode control information indicating the operation end to each part of the control part 110. When the mode control information indicating the operation end is inputted from the mode control part 128, each part of the control part 110 ends their respective predetermined processing. When the extracted mode setting information indicates minutes creation, the mode control part 128 outputs mode control information indicating minutes creation to the minutes creating part 122. When the mode control information indicating that it is necessary to create minutes is inputted from the mode control part 128, the minutes creating part 122 starts to store to the storage part 130 the display text information inputted from the text processing part 120. Therefore, the creation of minutes is started. When the extracted mode setting information indicates that it is not necessary to create minutes, the mode control part 128 outputs mode control information indicating that it is not necessary to create minutes to the minutes creating part 122. When the mode control information indicating that it is not necessary to create minutes is inputted from the mode control part 128, the minutes creating part 122 stops storing to the storage part 130 the display text information inputted from the text processing part 120. Therefore, the creation of minutes is stopped.

The storage part 130 stores various data used for processing in the control part 110 and various data acquired by the control part 110. The storage part 130 is configured to include, for example, a storage medium such as the above ROM and RAM.

The communication part 140 is connected to a network in a wireless or wired manner using a predetermined communication method and enables transmission and reception of various data with other devices. The communication part 140 is configured to include, for example, a communication interface. The predetermined communication method may be a method specified by any standard such as IEEE 802.11, 4G (4th generation mobile communication system), 5G (5th generation mobile communication system), and the like The input/output part 150 enables input and output of various data in a wireless or wired manner with other members or devices by using a predetermined input/output method. The predetermined input/output method may be a method specified by any standard such as USB (universal serial bus), IEEE 1394, and the like. The input/output part 150 is configured to include, for example, an input/output interface.

The sound collecting part 160 collects the voice coming thereto and outputs the voice data indicating the collected voice to the control part 110 via the input/output part 150. The sound collecting part 160 includes a microphone. The number of the sound collecting parts 160 is not limited to one but may be two or more. The sound collecting part 160 may be, for example, a portable wireless microphone. The wireless microphone mainly collects the uttered voice of the respective holder.

The operation part 170 receives an operation by the user and outputs an operation signal corresponding to the received operation to the control part 110 via the input/output part 150. The operation part 170 may be provided with a general-purpose input device such as a touch sensor, a mouse, and a keyboard, or may be provided with a dedicated member such as a button, a knob, and a dial.

The display part 180 displays display information (e.g., the display pictures shown in FIG. 2 and FIG. 3) based on a display data such as a display picture data inputted from the control part 110. The display part 180 may be a display of any type, such as a liquid crystal display (LCD), an organic electro-luminescence display (OELD), and the like. The display region of the display forming the display part 180 may be overlapped with the detection regions of the touch sensors forming the operation part 170 to be configured as a single touch panel.

(Terminal Device)

Next, a configuration example of the terminal device 200 according to this embodiment will be described. The terminal device 200 includes a control part 210, a storage part 230, a communication part 240, an input/output part 250, an operation part 270, and a display part 280.

The control part 210 realizes the functions of the terminal device 200 and controls the functions by performing various calculation processings. Although the control part 210 may be realized by a dedicated member, it may also include a processor and a storage medium such as a ROM and a RAM. The processor reads a predetermined control program stored in the ROM in advance, develops the read program in the RAM, and uses the storage region of the RAM as a working region. The processor executes processings instructed by various instructions described by the read program to realize the functions of the control part 210.

The control part 210 receives a display picture data from the conversation support device 100 using the communication part 240, and outputs the received display picture data to the display part 280. The display part 280 displays a display picture based on the display picture data inputted from the control part 210. The control part 210 receives an operation signal indicating a character from the operation part 270 during display of the display picture, and transmits text information indicating a text composed of one or more received characters to the conversation support device 100 by using the communication part 240 (text input). The text received at this stage corresponds to the second text described above.

Among the display text allocated in the text display region of the display picture, the control part 210 determines a section of a part of the display text instructed by the operation signal inputted from the operation part 270, and when fixing of the display position is instructed by the operation signal, the control part 210 generates fixing instruction information indicating fixing of the display position for the determined section (pinning instruction). The control part 210 transmits the generated fixing instruction information to the conversation support device 100 by using the communication part 240.

When the operation signal inputted from the operation part 270 instructs the fixed text allocated to the display picture, the control part 210 generates fixing release information indicating release of fixing of the display position for the fixed text (unpinning). The control part 210 transmits the generated fixing release information to the conversation support device 100 by using the communication part 240.

Among the display text allocated in the text display region of the display picture, the control part 210 determines a section of a part of the display text instructed by the operation signal inputted from the operation part 270, and when deletion is instructed by the operation signal, the control part 210 generates text deletion information indicating deletion of the display text for the determined section (text deletion). The control part 210 transmits the generated text deletion information to the conversation support device 100 by using the communication part 240.

The storage part 230 stores various data used for processing in the control part 210 and various data acquired by the control part 210. The storage part 230 is configured to include, for example, a storage medium such as a ROM and a RAM.

The communication part 240 is connected to a network in a wireless or wired manner using a predetermined communication method and enables transmission and reception of various data with other devices. The communication part 240 is configured to include, for example, a communication interface.

The input/output part 250 enables input and output of various data with other members or devices by using a predetermined input/output method. The input/output part 250 is configured to include, for example, an input/output interface.

The sound collecting part 260 collects the voice coming thereto and outputs the voice data indicating the collected voice to the control part 210 via the input/output part 250. The sound collecting part 260 includes a microphone. The voice data acquired by the sound collecting part 260 may be transmitted to the conversation support device 100 via the communication part 240, and voice recognition processing may be performed in the conversation support device.

The operation part 270 receives an operation by the user and outputs an operation signal corresponding to the received operation to the control part 210 via the input/output part 250. The operation part 270 includes an input device.

The display part 280 displays display information based on a display data such as a display picture data inputted from the control part 210. The display part 280 includes a display. The display forming the display part 280 may be integrated with touch sensors forming the operation part 270 to be configured as a single touch panel.

(Display Example)

Figure 2:
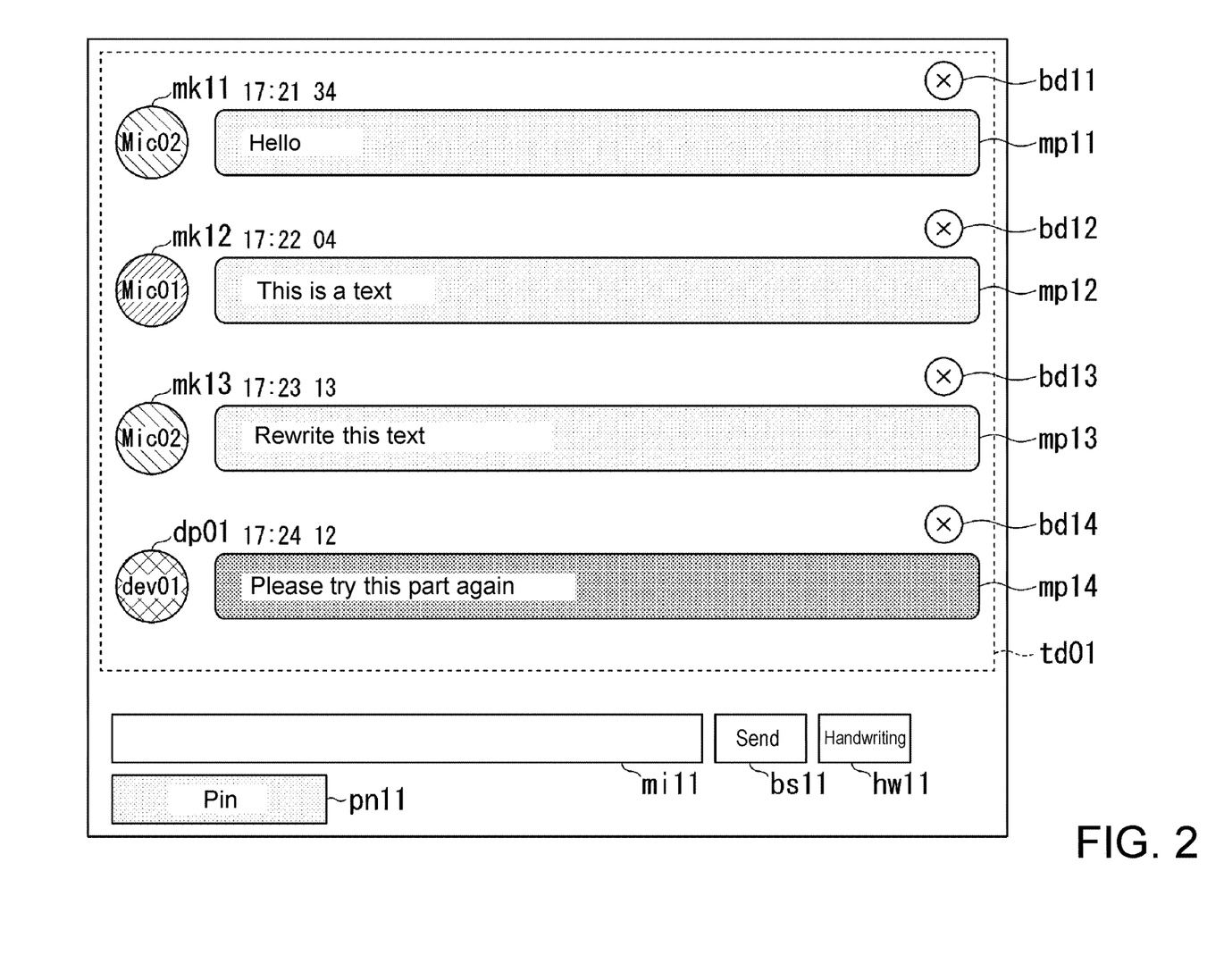
FIG. 2 is a view showing an example of a display picture according to this embodiment.

Next, an example of the display picture according to this embodiment will be described. FIG. 2 is a view showing an example of a display picture according to this embodiment. The display picture shown in FIG. 2 may be displayed on the display part 280 of the terminal device 200. Further, a display picture including an operation region (to be described later) may be displayed on the display part 180 of the conversation support device 100. In the display picture shown in FIG. 2, the display text of each utterance is displayed in a respective display frame (speech balloon). It is noted that the fixed text is not displayed in the display picture shown in FIG. 2.

A text display region td01, a text input field mi11, a send button bs11, a handwriting button hw11, and a pin button pn11 are arranged in the display picture shown in FIG. 2. The text display region td01 occupies most of the area of the display picture (e.g., more than half of the area ratio). A set of an acquisition source identification display and a display frame is arranged for each utterance in the text display region td01. When updating the display picture, each time display text information is acquired, the display processing part 124 of the conversation support device 100 arranges, in each row in the text display region, a display frame in which an acquisition source identification display corresponding to acquisition source identification information added to the display text information, and a display text indicated by such display text information are arranged. The display processing part 124 arranges date and time information at the upper left corner of each display frame and a delete button at the upper right corner. When acquiring new display text information after the text display region td01 is filled with sets of the acquisition source identification display and the display frame, the display processing part 124 moves the already arranged sets of the acquisition source identification display and the display frame in a predetermined direction (e.g., upward), and arranges a set of a display frame in which a new display text is arranged and an acquisition source identification display related to this display text in a free region generated at the end (e.g., the lower side) with respect to the moving direction of the text display region td01 (scrolling). The display processing part 124 erases sets of the acquisition source identification display and the display frame which have been moved out of the text display region td01.

The acquisition source identification display is a display indicating the acquisition source of each utterance. In the example shown in FIG. 2, a device display dp01 and sound collecting part displays mk11 to mk13 correspond to the acquisition source identification displays respectively indicating a device dev01 and microphones Mic01 to Mic03 as the acquisition sources. "dev01" is an abbreviation indicating the terminal device 200 as a device from which the second text is acquired. "Mic01" to "Mic03" are abbreviations respectively indicating the microphones Mic01 to Mic03. The display processing part 124 extracts the acquisition source identification information from each of the first text information and the second text information inputted thereto, and determines the acquisition source indicated by the extracted acquisition source identification information. The display processing part 124 generates an acquisition source identification display including characters indicating the determined acquisition source. The display processing part 124 may include in the acquisition source identification display a symbol or a pattern for determining each acquisition source, together with characters or in place of characters. The display processing part 124 may set a different mode for the acquisition source identification display according to the acquisition source and display in such a mode. The mode of the acquisition source identification display may be, for example, any of a background color, a concentration, a display pattern (filling, shading, etc.), a shape, and the like.

Display frames mp11 to mp14 are frames in which the display text of each utterance is arranged. The date and time information and the delete button are respectively arranged at the upper left corner and the upper right corner of each display frame. The date and time information indicates the date and time when the display text arranged in the display frame is acquired. Delete buttons bd11 to bd14 are buttons for instructing deletion of the display frames mp11 to mp14 and the acquisition source identification displays arranged in association with each other upon pressing. In this application, "pressing" includes the meaning of instructing a picture component such as a button, instructing a position in the display region of the picture component, and acquiring an operation signal indicating the position. For example, when pressing of the delete button bd12 is detected, the display processing part 124 erases the sound collecting part display mk12 and the display frame mp12, and erases the date and time information "17:22 04" and the delete button bd12 attached to the display frame mp12. More specifically, the control part 210 determines a delete button which includes a position instructed by an operation signal received from the operation part 270 in the display region, generates text deletion information indicating erasing of the display frame including the display text corresponding to the delete button and the acquisition source display, and transmits the text deletion information to the display control information acquisition part 126 of the conversation support device 100. The display control information acquisition part 126 outputs the text deletion information received from the terminal device 200 to the display processing part 124. The display processing part 124 updates the display picture by erasing the display frame and the acquisition source display instructed by the text deletion information from the display control information acquisition part 126, and erasing the date and time information and the delete button attached to the display frame.

The text input field mi11 is a field for receiving an input of a text. The control part 210 determines characters instructed by an operation signal inputted from the operation part 270, and sequentially arranges the determined characters in the text input field mi11. The count of characters which may be received at a time is limited within the size of the text input field mi11. This count of characters may be predetermined based on a range such as the typical count of characters and words which make one utterance (e.g., within 30 to 100 full-width Japanese characters).

The send button bs11 is a button for instructing transmission of a text composed of the characters arranged in the text input field mi11 upon pressing. When the send button bs11 is instructed by an operation signal inputted from the operation part 270, the control part 210 transmits text information indicating the text arranged in the text input field mi1 at this time to the text acquisition part 118 of the conversation support device 100.

The handwriting button hw11 is a button for instructing handwriting input upon pressing. When the handwriting button hw11 is instructed by an operation signal inputted from the operation part 270, the control part 210 reads a handwriting input picture data stored in the storage part 230 in advance and outputs it to the display part 280. The display part 280 displays a handwriting input picture (not shown) based on the handwriting input picture data inputted from the control part 210. The control part 210 sequentially determines positions in the handwriting input picture according to an operation signal inputted from the operation part 270, and transmits handwriting input information indicating curves composed of tracks of the determined positions to the conversation support device 100. When receiving the handwriting input information from the terminal device 200, the display processing part 124 of the conversation support device 100 sets a handwriting display region at a predetermined position in the display picture. The handwriting display region may be within the range of the text display region or may be out of this range. The display processing part 124 updates the display picture by arranging the curves indicated by the handwriting input information in the set handwriting display region.

The pin button pn11 is a button for instructing fixing a display position of a display text in a freshly designated section among the display text displayed in the text display region td01, to a predetermined position upon pressing. In the example shown in FIG. 2, the section of which the display position is to be fixed may be designated by the display frame. More specifically, the control part 210 may define a display frame including a position indicated by an operation signal inputted from the operation part 270 in the display region as the display frame having the display text of which the display position is to be fixed. Immediately afterwards, when an operation signal indicating the pin button pn11 is inputted from the operation part 270, the control part 210 generates fixing display information for instructing fixing of the display position for the determined display text, and transmits the generated fixing display information to the conversation support device 100. The display processing part 124 of the conversation support device 100 arranges the display text instructed by the fixing display information as a fixed text in a predetermined fixed display region fd01 (FIG. 3). For example, immediately after the display frame mp13 is instructed, by pressing the pin button pn11, the display position of the display text "Rewrite this text" arranged in the display frame mp13 is fixed at a predetermined position. Immediately after the display frame mp14 is instructed, by pressing the pin button pn11, the display position of the display text "Please try this part again" arranged in the display frame mp14 is fixed at a predetermined position. When the fixed text is arranged at the predetermined display position, the display processing part 124 of the conversation support device 100 may update the display picture by arranging an unpin button pn12 (FIG. 3) in place of the pin button pn11. Doing so limits the number of fixed texts to one displayed at a time. Further, when displaying the fixed text in the display picture, the display processing part 124 may reject the fixing instruction information inputted from the display control information acquisition part 126.

In the display processing part 124, the display text information newly inputted from the text processing part 120 may be display text information based on the second text information, and fixing instruction information indicating the display text indicated by such display text information may be inputted from the display control information acquisition part 126. In other words, the control part 110 acquires the fixing instruction information at the same time as the second text information. In that case, the display processing part 124 may allocate a display frame including such a display text as a fixed text to the fixed display region. The display processing part 124 may update the display picture by allocating the display frame including such a display text to the text display region, or may update the display picture without allocating such a display text to the text display region. In the case of not allocating to the text display region, the display processing part 124 does not move (scroll) the position of the display text already allocated to the text display region. To allow the user to instruct the text input and the pinning at the same time, a pin send button may be further displayed in the display picture. When an operation signal instructing the pin send button is inputted from the operation part 270, the control part 210 of the terminal device 200 transmits the text information indicating the already received text and the fixing instruction information indicating such a text as the target to the conversation support device 100.

The display processing part 124 may display the fixed text more preferentially than other display texts. For example, the display processing part 124 sets the display mode of the fixed text to be more conspicuous than the display texts. The more conspicuous mode may be any of a thick character, addition of decoration, a large size, a high contrast with the background in the display frame, a high saturation, a higher display position in the vertical direction, or the like, or any combination of the above. The display processing part 124 may set a part or all region of the display frame of the fixed display region to be a region which overlaps with a part of the display frame of the text display region (e.g., a part of the display frame arranged at the topmost of the text display region). In the overlapping region, the display processing part 124 displays the display frame (including the fixed text) of the fixed display region, and does not display the display frame (including the display text) displayed in the part of the text display region.

Next, another example of the display picture according to this embodiment will be described. FIG. 3 is a view showing an example of a display picture according to this embodiment. In the display picture shown in FIG. 3, a fixed text is displayed in addition to the display text for each utterance. Hereinafter, the differences from the example shown in FIG. 2 will be mainly described.

In the display picture shown in FIG. 3, a text display region td01, a text input field mi11, a send button bs11, and a handwriting button hw11 are arranged, and an unpin button pn12 is arranged in place of the pin button pn11 (FIG. 2). Further, a fixed display region fd01 and an operation region fw01 are further arranged in the display picture. The display picture shown in FIG. 3 may be displayed on the display part 180 of the conversation support device 100. The part of the display picture excluding the operation region fw01 may also be displayed on the display part 280 of the terminal device 200.

The fixed display region fd01 is a region in the display picture displaying the fixed text. In the example shown in FIG. 3, it is allocated to the upper part in the same column as the text display region td01. In the fixed display region fd01, a device display dp01 and a display frame pp01 are sequentially juxtaposed in one row. The fixed text is arranged in the display frame pp01. Date and time information and a pin mark pn01 are respectively arranged at the upper left corner and the upper right corner of the display frame pp01. When the fixed text is determined from the display text, the display processing part 124 arranges in the fixed display region fd01 an acquisition source identification display corresponding to acquisition source identification information added to the display text information indicating the fixed text, and a display frame in which a display text indicated by such display text information is arranged. The display processing part 124 arranges the date and time information at the upper left corner of the display frame and a pin mark at the upper right corner.

The pin mark pn01 has a shape having a sharp tip, and the base end and the tip thereof are respectively arranged at positions and orientations belonging to the outside and inside of the display frame pp01. The pin mark pn01 is a sign indicating that the display position of the fixed text arranged in the display frame pp01 indicated at the end point of the pin mark pn01 is fixed.

The unpin button pn12 is a button for instructing release of fixing of the display position of the fixed text upon pressing. More specifically, when an operation signal indicating the unpin button pn12 is inputted from the operation part 270, the control part 210 of the terminal device 200 generates fixing release information for instructing release of fixing of the display position of the fixed text, and transmits the generated fixing release information to the conversation support device 100. When the fixing release information is inputted from the display control information acquisition part 126, the display processing part 124 of the conversation support device 100 erases the acquisition source identification display, the display frame, the time information attached to the display frame arranged in the fixed display region fd01, and the unpin button. When a display text in the section determined as the fixed text is erased, the display processing part 124 determines a sequence of the utterance based on the utterance identification information added to the display text information indicating such a display text. The display processing part 124 rearranges the set of the display frame including such a display text and the acquisition source identification display related to the display text at a position according to the determined sequence. However, depending on the progress of the conversation during the period when the display position is fixed, the position may fall outside the range of the text display region td01. In that case, the display processing part 124 does not show the display frame and the acquisition source identification display related to the display text in the display picture since they are not arranged in the text display region td01. In addition, when releasing fixing of the display position of the fixed text, the display processing part 124 of the conversation support device 100 may update the display picture by arranging the pin button pn11 (FIG. 2) in place of the unpin button pn12. Accordingly, it is possible to instruct fixing of the display position of the display text again. Further, when the fixed text is displayed in the display picture, the display processing part 124 may reject the fixing release information inputted from the display control information acquisition part 126. In addition, the display processing part 124 may employ the fixing release information acquired from the same device (e.g., the terminal device 200) as the device from which the fixing instruction information related to the display of the fixed text is acquired, and reject the fixing release information acquired from other devices. Accordingly, it is possible to prevent a participant other than the participant who has instructed to fix the display position from releasing the fixing. Therefore, the display control information acquisition part 126 adds the fixing instruction information or the fixing release information inputted from the communication part 140 to the device identification information of the acquisition source and outputs to the display processing part 124. Similarly, the display control information acquisition part 126 adds the fixing instruction information or the fixing release information acquired from an operation signal inputted from the input/output part 150 to the device identification information of the acquisition source of such an operation signal and outputs to the display processing part 124.

The pin mark pn01 may function as a button. When the pin mark pn01 is instructed by an operation, the control part 210 of the terminal device 200 may release fixing of the display position of the fixed text. Herein, when the fixed text is displayed and an operation signal indicating the pin mark pn01 is inputted from the operation part 270, the control part 210 may generate fixing release information for instructing release of fixing of the display position of the fixed text and transmit the generated fixing release information to the conversation support device 100. In that case, the unpin button pn12 may be omitted.

The operation region fw01 is a display region in which various picture components for displaying the operations and operation statuses with respect to the conversation support device 100 are arranged. A start button bs01, an end button bs02, a question display bs03, a setting button bs04, a device display dv01, a sound collecting part display mc01, and a function button group fn01 are arranged in the operation region fw01.

The start button bs01 is a button for instructing an operation start, i.e., start of the conversation support processing (FIG. 4), upon pressing.

The end button bs02 is a button for instructing an operation end, i.e., end of the conversation support processing (FIG. 4), upon pressing.

The question display bs03 is a display indicating that any participant is asking a question at this time. When fixing and displaying the fixed text at the predetermined position, the display processing part 124 of the conversation support device 100 may display the question display bs03 by arranging it in the operation region fw01, and at other times, it is possible not to display the question display bs03. This makes it possible for the participants to be aware that the fixed text indicates the content of the question.

The setting button bs04 is a button for displaying a setting picture upon pressing. The mode control part 128 may set various parameters related to the operations of the conversation support device 100 according to the acquired operation signal during display of the setting picture.

The device display dv01 is a display indicating the device from which the first text information is acquired. In the example shown in FIG. 3, the terminal device 200 indicated by dev01 is shown as the acquisition source of the first text information. The display processing part 124 may determine the device indicated by the device identification information inputted from the communication part 140 or the input/output part 150 as the device that may acquire the first text information and other data. Each of the communication part 140 and the input/output part 150 may determine a device connected thereto and acquire device identification information indicating the determined device. Also, the mode control part 128 may set a device button for each determined device as one mode of the device display dv01, and by pressing the device button, may set whether various data from the device corresponding to the pressed device button are inputted.

The sound collecting part display mc01 is a display indicating a sound collecting part from which a voice data is acquired, and in the example shown in FIG. 3, the sound collecting part 160 indicated by Mic01 and Mic02 is shown. The display processing part 124 may determine the sound collecting part 160 indicated by the device identification information and inputted from the input/output part 150 as the device that may acquire the voice data. The input/output part 150 may determine the sound collecting part 160 connected thereto and acquire the device identification information indicating the determined sound collecting part 160. Also, the mode control part 128 may function as a sound collecting part button for each determined sound collecting part 160 as one mode of the sound collecting part display mc01, and by pressing the sound collecting part button, may set whether a voice data from the sound collecting part 160 corresponding to the pressed sound collecting part button is inputted.

The function button group fn01 is a set of buttons for instructing functions upon pressing. In the example shown in FIG. 3, the function button group fn01 includes an all-conversation recording button, a deleted text recording button, and a minutes button.

The all-conversation recording button is a button for instructing all-conversation recording upon pressing. All-conversation recording refers to recording all the voice data in the conversation performed during the operation. For example, when an operation signal indicating the all-conversation recording button is inputted, the mode control part 128 outputs mode control information indicating all-conversation recording to the minutes creating part 122. The minutes creating part 122 stores to the storage part 130 the voice data inputted from the sound collecting part 160 in association with the minutes information. The minutes creating part 122 may store to the storage part 130 the inputted voice data in association with the display text generated based on the voice data. The voice analysis part 112 outputs the voice feature quantity for each utterance in association with the voice data related to the utterance to the voice recognition part 114. The voice recognition part 114 outputs the first text information for each utterance in association with the voice data related to the utterance to the text processing part 120. Then, the text processing part 120 outputs the display text information based on the first text information for each utterance in association with the voice data related to the utterance to the minutes creating part 122.

The deleted text recording button is a button for instructing deleted text recording upon pressing. Deleted text recording refers to recording the voice data of the voice indicating the utterance content in the deleted text. For example, when an operation signal indicating the deleted text recording button is inputted, the mode control part 128 outputs mode control information indicating deleted text recording to the minutes creating part 122. Further, when text deletion information is extracted from an acquired operation signal, the display control information acquisition part 126 also outputs the extracted text deletion information to the minutes creating part 122. When the mode control information indicating deleted text recording is inputted from the mode control part 128, the minutes creating part 122 performs deleted text recording. In other words, the minutes creating part 122 stores the display text information and the voice data in association with each other for each utterance to the storage part 130 in a manner as described above. Then, the display text information instructed by the text deletion information inputted from the display control information acquisition part 126 is erased, and the voice data corresponding to the erased display text information is not erased but remains stored in the storage part 130.

The minutes button is a button for instructing minutes creation upon pressing. For example, when an operation signal indicating the minutes button is inputted, the mode control part 128 outputs mode control information indicating minutes creation to the minutes creating part 122. When the mode control information indicating minutes creation is inputted from the mode control part 128, the minutes creating part 122 generates minutes information in a manner as described above.

(Conversation Support Processing)

Figure 4:
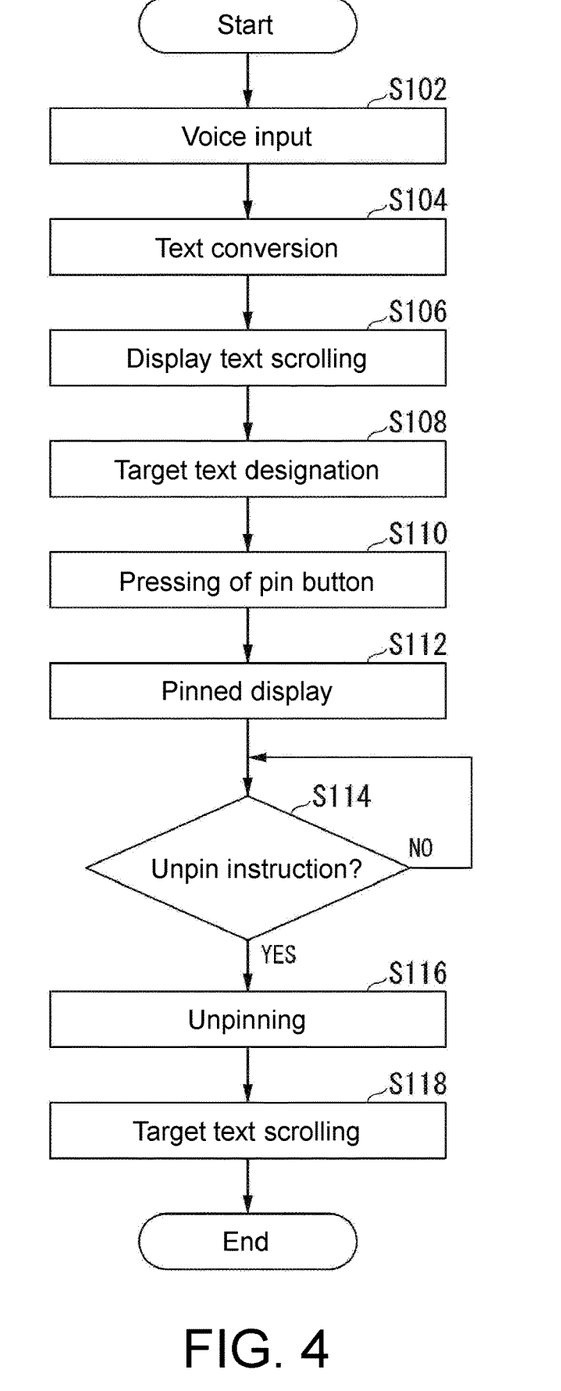
FIG. 4 is a flowchart showing an example of a conversation support processing according to this embodiment.

Next, an example of the conversation support processing according to this embodiment will be described. FIG. 4 is a flowchart showing an example of a conversation support processing according to this embodiment. In the scenario described below as an example, a text input from the terminal device 200 is performed, and the inputted text is scrolled as a display text and is further pin-displayed and unpinned as a fixed text. In the following description, unless otherwise determined, it is assumed that the acquisition source identification display, the time display, the delete button, and the pin mark are displayed or erased according to the respective corresponding display frame, and the descriptions thereof will be omitted.

(Step S102) The sound collecting part 160 collects a voice of a participant of the conversation, and outputs a voice data indicating the collected voice to the voice analysis part 112. The voice data is inputted to the voice analysis part 112 from the sound collecting part 160 (voice input), and the voice analysis part 112 determines an utterance section from the inputted voice data and outputs a voice feature quantity analyzed from the voice data to the voice recognition part 114 for each determined utterance section.

(Step S104) The voice recognition part 114 performs a voice recognition processing on the voice feature quantity inputted from the voice analysis part 112 for each utterance section, and converts it into a first text indicating an utterance content (text conversion).

(Step S106) The display processing part 124 of the conversation support device 100 moves display frames including display texts already allocated to the text display region of the display picture in a predetermined direction (display text scrolling). The display processing part 124 erases the display frame of the display text that has been moved out of the text display region, and at the same time, allocates a display frame including the converted first text to a free region generated by the movement in the text display region as a display text, and displays the display text in the display picture.

(Step S108) The control part 210 of the terminal device 200 determines any one of the display frames arranged in the text display region by an inputted operation signal (target text designation). For example, a display frame including a latest text received by its own device may be determined as the display text of which the display position is to be fixed.

(Step S110) When the pin button of the display picture is instructed by an inputted operation signal (pressing of pin button), the control part 210 transmits fixing instruction information indicating the display text of the section in the determined display frame as the fixing target of the display position to the conversation support device 100. The display control information acquisition part 126 of the conversation support device 100 outputs the fixing instruction information received from the terminal device 200 to the display processing part 124.

(Step S112) The display processing part 124 of the conversation support device 100 determines the display text instructed by the fixing instruction information inputted from the display control information acquisition part 126, adopts the determined display text as the fixed text, and allocates the display frame including the adopted fixed text to the fixed display region in the display picture (pinned display). Herein, both the first text based on the voice data and the second text based on the operation signal may be the fixed text of which the display position is fixed.

(Step S114) The display processing part 124 of the conversation support device 100 waits for the input of fixing release information from the display control information acquisition part 126 (unpin instruction). When the fixing release information is inputted (step S114 "YES"), the display processing part 124 proceeds to the processing of step S116. When the fixing release information is not inputted (step S114 "NO"), the display processing part 124 repeats the processing of step S114. When the unpin button of the display picture is instructed (pressed) by an inputted operation signal, the control part 210 of the terminal device 200 transmits fixing release information indicating release of fixing of the display position for the fixed text to the conversation support device 100. The fixing release information received from the display control information acquisition part 126 of the conversation support device 100 is outputted to the display processing part 124.

(Step S116) The display processing part 124 of the conversation support device 100 erases the display frame including the fixed text from the fixed display region (unpinning).

(Step S118) Each time new display text information is inputted from the text processing part 120, the display processing part 124 moves the display frames including the display texts already allocated to the text display region, and allocates a display frame including a display text indicated by the inputted text information to a free region generated by the movement. The display text to be moved also includes a text instructed as the fixed text (target text scrolling).

In step S112, the display processing part 124 of the conversation support device 100 may maintain or may erase the display frame including the display text adopted as the fixed text in the text display region. In the case of maintaining such a display frame, the display text of the section of which the display position is to be fixed is duplicated (copied) as the fixed text, and the display text is also left in the text display region. Therefore, even before the processing of step S118 is started, the display text that is the duplication source of the fixed text may also be the target of the movement. On the other hand, in the case of erasing such a display frame, when proceeding to the processing of step S118, the display processing part 124 rearranges the display frame including the display text adopted as the fixed text in the text display region.

The display processing part 124 determines the position of such a display frame, for example, as a position corresponding to the sequence at which such a display text (hereinafter, "rearranged text") is acquired, between the display frame of the display text immediately before the rearranged text and the display frame of the display text immediately after the rearranged text. The display processing part 124 may determine based on the utterance identification information added to the display text information indicating the rearranged text. To ensure the display region for rearrangement, the display processing part 124 moves each display frame of the display text acquired before the rearranged text in the predetermined direction, and erases the display frame which is moved out of the range of the text display region. However, when the determined position of the display frame of the rearranged text falls outside the text display region, it is possible that the display processing part 124 does not allocate the display frame in the text display region and include and display it in the display picture.

In addition, the display processing part 124 may determine the position of the display frame of the rearranged text as a position at the end of the text display region in the same manner as the display frame of the latest display text at this time, and arrange the display frame at the determined position. In that case, the display processing part 124 moves the display frame including the display text already allocated to the text display region at this time, and erases the display frame of which the position after the movement falls outside the text display region. As a result, the latest display text and the display text which has been displayed as the fixed text are displayed adjacent to each other. For example, an answer to a question which appears in the fixed text is displayed as the latest display text. Therefore, the user can intuitively understand the association between the two.

As described above, the conversation support device 100 according to this embodiment includes the voice recognition part 114 which performs voice recognition on a voice data and generates an utterance text which is a text indicating an utterance content. In addition, the conversation support device 100 includes the display processing part 124 which moves the position of a display text displayed on the display part 180, displays the utterance text as a display text in a free region generated by the movement, and fixes a display text in a section of which fixing of a display position is instructed according to an operation as a fixed text at a predetermined display position and displays it on the display part 180. With this configuration, the display position of the display text instructed according to the operation of the participant is fixed at the predetermined display position. Therefore, even if a text indicating a new utterance content is acquired, the display position does not move as the other display texts do, so it is possible to allow the participants (e.g., a person with a hearing disability) of the conversation to more surely recognize the utterance content indicated by the fixed text without disturbing the conversation.

Further, the display processing part 124 may display the fixed text more preferentially than other display texts. According to this configuration, the participants who come into contact with the display picture may pay attention to the fixed text more easily than other display texts. Therefore, the utterance content indicated by the fixed text may be more surely recognized by the participants of the conversation.

Further, the conversation support device 100 may include the voice analysis part 112 which calculates a characteristic parameter indicating a characteristic of a voice data for each frame, determines a voiceless section and a voice section based on the characteristic parameter, and determines as an utterance section a section ranging from the voice section started after the voiceless section which lasted for a predetermined time or longer, to start of a next voiceless section which lasts for the predetermined time or longer. Further, the display processing part 124 may display each utterance section as a display text on the display part 180, and determine the display text in any section of the utterance section displayed on the display part 180 as a fixed text. According to this configuration, a display text indicating the utterance content is displayed for each utterance section of the participants, and the fixed text is determined. Therefore, compared to the case where the display text is displayed without dividing into utterance sections, the participants who come into contact with the display text can easily understand the utterance content indicated by the display text and determine individual utterances in the conversation.

Further, the display processing part 124 may display a display (e.g., a sound collecting part display) indicating the sound collecting part 160 or 260 or the terminal device 200 which has acquired the voice data in association with the first text. According to this configuration, the user who comes into contact with the display may intuitively learn about the device which is the acquisition source of the voice data from which the first text indicating the utterance content is converted, or may intuitively learn about the user who mainly uses such a device.

Further, when release of fixing of the display position of the fixed text is instructed according to an operation, the display processing part 124 may release fixing of the display position of the fixed text. According to this configuration, since fixing of the display position of the fixed text is released, it is possible to distract other participants from the fixed text and prompt them to return to the original agenda or change to another agenda.

Further, the display processing part may duplicate the display text in the section of which fixing of the display position is instructed as the fixed text according to an operation, and may erase the fixed text when fixing of the display position of the fixed text is released. According to this configuration, since the display text of the section instructed as the fixed text is also moved according to the addition of a new display text in the same manner as other display texts, the processing for rearranging the fixed text as the display text may be omitted.

Although one embodiment of the disclosure has been described in detail with reference to the drawings, the specific configuration is not limited to the above, and various design changes and the like may be made without departing from the gist of the disclosure.

For example, it is possible that the sound collecting part 160, the operation part 170, and the display part 180 are not integrated with the conversation support device 100, and any one or combination of them may be a component separate from the conversation support device 100 as long as various data may be transmitted and received in a wireless or wired manner.

The voice analysis part 112 may acquire a voice data from the sound collecting part 260 of the terminal collection 200 in place of the sound collecting part 160 or together with the sound collecting part 160.

The text acquisition part 118 may acquire the second text information based on an operation signal inputted from the operation part 170 of its own device in place of the operation part 270 of the terminal device 200.

When the text acquisition part 118 does not acquire the second text information from the terminal device 200, it is possible not to transmit the display picture data to the terminal device 200.

Further, the shape of the display frame surrounding the display text is not limited to the speech balloon shown in FIG. 2 and FIG. 3, and it may be any shape such as an ellipse, a rectangle, a parallelogram, or a cloud shape as long as the display text can be accommodated. Further, the width in the horizontal direction and the height in the vertical direction of each display frame may be unified to constant values. In that case, the quantity of vertical movement at the time of allocation of a new display text is equal to the height in the vertical direction and the spacing between the adjacent display frames. The display text may be displayed by a line break for each utterance without being accommodated and displayed in the display frame. In addition, the position and size of each display element forming the display picture such as the buttons and the input fields are arbitrary, and some of them may be omitted, or display elements not shown in FIG. 2 and FIG. 3 may be included. Further, the wordings and the names of the display elements attached to the display picture may be arbitrarily set as long as they do not deviate from the gist of the embodiment of this application.

What is claimed is:

1. A conversation support device comprising:
a processor configured to function as:
a voice recognition part performing voice recognition on a voice data and generating an utterance text which is a text indicating an utterance content; and
a display processing part moving a position of a display text displayed on a display part, displaying the utterance text as a new display text in a free region generated by the moving of the display text, and displaying one of the display text or the new display text as a fixed text at a predetermined display position on the display part in response to a first operation,
wherein the fixed text is not scrolled while the display processing part moves either of the display text or the new display text that is not the fixed text,
wherein when the fixed text is instructed according to a second operation, the display processing part releases fixing of the fixed text at the predetermined display position,
wherein the display processing part duplicates one of the display text or the new display text as the fixed text to display at the predetermined display position in response to the first operation, and erases the fixed text when fixing of the fixed text is released according to the second operation.

2. The conversation support device according to claim 1, wherein the display processing part displays the fixed text more preferentially than other display texts.

3. The conversation support device according to claim 2, wherein the processor is configured to function as a voice analysis part which calculates a characteristic parameter indicating a characteristic of the voice data for each frame, determines a voiceless section and a voice section based on the characteristic parameter, and determines as an utterance section a section ranging from the voice section started after the voiceless section which lasted for a predetermined time or longer, to start of a next voiceless section which lasts for the predetermined time or longer,
wherein the display processing part displays the utterance text on the display part for each utterance section, and determines the display text in any section of the utterance section displayed on the display part as the fixed text.

4. The conversation support device according to claim 3, wherein the display processing part displays a display indicating a sound collecting part which has acquired the voice data in association with the utterance text.

5. The conversation support device according to claim 1, wherein the processor is configured to function as a voice analysis part which calculates a characteristic parameter indicating a characteristic of the voice data for each frame, determines a voiceless section and a voice section based on the characteristic parameter, and determines as an utterance section a section ranging from the voice section started after the voiceless section which lasted for a predetermined time or longer, to a start of a next voiceless section which lasts for the predetermined time or longer,
wherein the display processing part displays the utterance text on the display part for each utterance section, and determines the display text in any section of the utterance section displayed on the display part as the fixed text.

6. The conversation support device according to claim 5, wherein the display processing part displays a display indicating a sound collecting part which has acquired the voice data in association with the utterance text.

7. A conversation support system, comprising:
the conversation support device according to claim 1; and
a terminal device,
wherein the terminal device comprises:
an operation part, comprising at least one of a touch sensor, a mouse, a keyboard, a button, a knob, or a dial, receiving the operation; and
a communication part, comprising a communication interface, transmitting the operation to the conversation support device.

8. A conversation support method, which is a conversation support method in a conversation support device, the conversation support method comprising:
a voice recognition step of performing voice recognition on a voice data and generating an utterance text which is a text indicating an utterance content; and
a display processing step of moving a position of a display text displayed on a display part, displaying the utterance text as a new display text in a free region generated by the movement, and displaying one of the display text or the new display text as a fixed text at a predetermined display position on the display part in response to a first operation,
wherein the fixed text is not scrolled while either of the display text or the new display text that is not the fixed text is moved in the display processing step,
wherein when the fixed text is instructed according to a second operation, fixing of the fixed text at the predetermined display position is released,
wherein one of the display text or the new display text is duplicated as the fixed text to display at the predetermined display position in response to the first operation, and the fixed text is erased when fixing of the fixed text is released according to the second operation.

9. A non-transitory computer readable storage medium, storing a program which causes a computer of a conversation support device to execute:
a voice recognition procedure of performing voice recognition on a voice data and generating an utterance text which is a text indicating an utterance content; and
a display processing procedure of moving a position of a display text displayed on a display part, displaying the utterance text as a new display text in a free region generated by the movement, and displaying one of the display text or the new display text as a fixed text at a predetermined display position on the display part in response to a first operation,
wherein the fixed text is not scrolled while either of the display text or the new display text that is not the fixed text is moved in the display processing procedure,
wherein when the fixed text is instructed according to a second operation, the display processing procedure releases fixing of the fixed text at the predetermined display position,
wherein the display processing procedure duplicates one of the display text or the new display text as the fixed text to display at the predetermined display position in response to the first operation, and erases the fixed text when fixing of the fixed text is released according to the second operation.

* * * * *